W. E. SAMPSON.
TIRE PROTECTOR.
APPLICATION FILED JAN. 25, 1910.

967,979.

Patented Aug. 23, 1910.

Witnesses
W. T. Woodson
Juana M. Fallin

Inventor
W. E. Sampson

By
H. W. A. W. Lacey, Attorney

UNITED STATES PATENT OFFICE.

WILLIAM E. SAMPSON, OF GRAND ISLAND, NEBRASKA.

TIRE-PROTECTOR.

967,979.      Specification of Letters Patent.      Patented Aug. 23, 1910.

Application filed January 25, 1910. Serial No. 540,069.

*To all whom it may concern:*

Be it known that I, WILLIAM E. SAMPSON, citizen of the United States, residing at Grand Island, in the county of Hall and State of Nebraska, have invented certain new and useful Improvements in Tire-Protectors, of which the following is a specification.

This invention comprehends certain new and useful improvements in resilient tires, and relates particularly to a puncture proof tire protector especially adapted for use with tires of the pneumatic type.

The invention has for its primary object a simple construction of tire protector, designed to be interposed between the inner tube and outer casing or shoe of a pneumatic tire, and the invention consists in certain constructions and arrangements of the parts that I shall hereinafter fully describe and claim.

Figure 1:
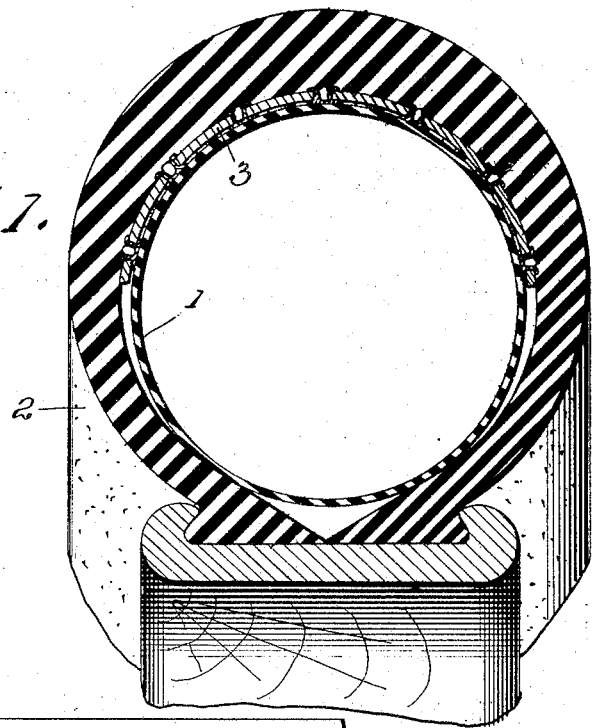
Figure 2:
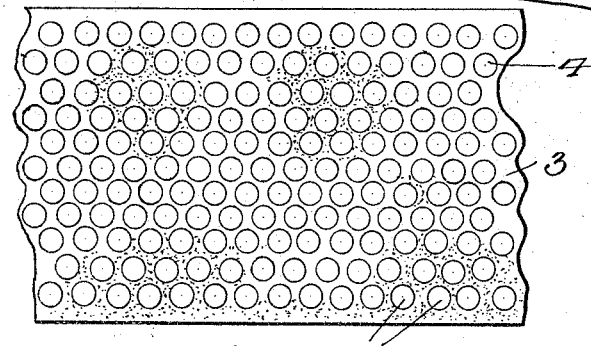
Figure 4:
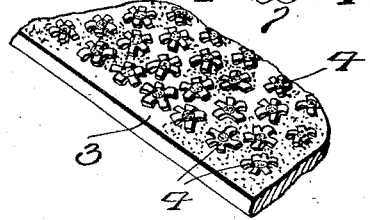
Figure 3:
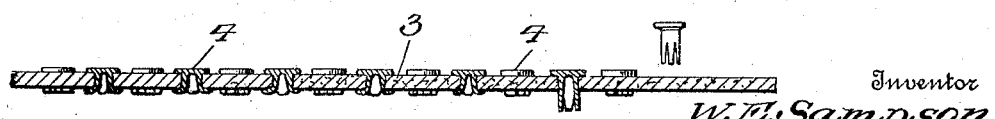

For a full understanding of the invention, reference is to be had to the following description and accompanying drawings, in which:

Figure 1 is a transverse sectional view of a tire equipped with my improved protector; Fig. 2 is a face view of a portion of the protecting band; Fig. 3 is a longitudinal sectional view of the band; and, Fig. 4 is a fragmentary perspective view of a portion of said band, looking at the opposite face from that shown in Fig. 2.

Corresponding and like parts are referred to in the following description and indicated in all the views of the drawings by the same reference characters.

Referring to the drawing, the numeral 1 designates the inner tube, and 2 the outer case or shoe of a pneumatic tire.

In carrying out my invention, I take a strip 3 of material, such as leather, of the requisite length and width according to the particular tire with which it is intended to be used, the said strip being either endless or having its ends connected together in any desired way to form a continuous band designed to extend circumferentially entirely around the tire and intended to be interposed between the tube 1 and casing 2. Preferably, the band is of a width to protect the entire tread surface of the tire. The strip 3 is studded with closely grouped rivets 4, said rivets being hollow, as indicated in the drawing, and all having flat heads disposed in one side of the strip 3, namely, with side edges contiguous to the inner tube 1, the ends of the rivets 4 being all split and spread outwardly and thus clenched in the outer surface of the strip, thereby producing a somewhat pebbled or roughened formation which will serve to frictionally engage the adjacent surface of the outer case or shoe 2 and effectually prevent the strip or protecting band from creeping. By this means all liability of tearing the inner tube by the use of the device is precluded.

From the foregoing description in connection with the accompanying drawings, the operations and advantages of my improved tire will be apparent.

In the practical use of the device, the strip 3 studded with its rivets 4, is interposed between the inner tube 1 and casing or shoe 2 with the roughened surface outermost, as shown. Manifestly, the band will effectually tend to prevent puncture of the inner tube, and it is clear that it may be easily made and readily applied and removed whenever desired.

Having thus described the invention, what is claimed as new is:

The combination with a tire embodying a casing and an inner tube, of a pliable protecting band interposed between the casing and the tube, said band being studded with closely grouped tubular rivets, the heads of which are flat and lie contiguous to the inner tube, and the opposite ends of the rivets being split and spread outwardly over and against the outermost face of the layer and slightly above the plane of said face whereby to engage the adjacent inner surface of the casing, so as to prevent the creeping of the band and as a consequence liability of the band tearing the inner tube.

In testimony whereof I affix my signature in presence of two witnesses.

WILLIAM E. SAMPSON. [L. S.]

Witnesses:
W. N. WOODSON,
FREDERICK S. STITT.